United States Patent [19]
Okano

[11] Patent Number: 5,305,028
[45] Date of Patent: Apr. 19, 1994

[54] MULTIFOCAL LENS PROVIDED WITH PROGRESSIVE FOCAL SEGMENT

[76] Inventor: Hitoshi Okano, 17-45, Izumi 4-Chome, Suginami-Ku, Tokyo 168, Japan

[21] Appl. No.: 74,267

[22] Filed: Jun. 9, 1993

Related U.S. Application Data

[63] Continuation of Ser. No. 474,115, Apr. 24, 1990, abandoned.

[51] Int. Cl.$^5$ ............................................... G02C 7/06
[52] U.S. Cl. ..................................... 351/169; 351/171; 351/172
[58] Field of Search .................... 350/437; 351/169; 359/721

[56] References Cited

U.S. PATENT DOCUMENTS

| | | | |
|---|---|---|---|
| 3,610,924 | 10/1971 | Sinai | 359/721 |
| 4,461,550 | 7/1984 | Legendre | 351/169 |
| 4,806,010 | 2/1989 | Ewer et al. | 351/172 X |
| 4,955,712 | 9/1990 | Barth et al. | 351/169 |

FOREIGN PATENT DOCUMENTS

| | | |
|---|---|---|
| 61-27115 | 2/1961 | Japan . |
| 54-104854 | 8/1979 | Japan . |
| 57-49914 | 3/1982 | Japan . |
| 57-180318 | 6/1982 | Japan . |
| 62-150215 | 7/1987 | Japan . |
| 62-183424 | 8/1987 | Japan . |
| 61-183434 | 8/1987 | Japan . |

Primary Examiner—Scott J. Sugarman
Attorney, Agent, or Firm—Ladas & Parry

[57] ABSTRACT

A multifocal lens has a main lens with a far vision surface refracting power sphere (F) and a near vision sphere (N) and a progressive focal area (P) or an intermediate vision sphere (I), a progressive focal point (P) and a near vision sphere (N) on a segment thereof for giving additional refracting power by surface refracting, in which case the segment projects from the main lens, or refractive index, in which case the segment is embedded in the main lens. A separately produced segment can also be stuck to the surface of the main lens, in which case a series of prism segments can be prepared in advance to select an optimum segment from the series of prism segments according to a prescription.

7 Claims, 7 Drawing Sheets

MULTIFOCAL LENS PROVIDED WITH PROGRESSIVE FOCAL SEGMENT

This is a continuation of copending application Ser. No. 07/474,115 filed on Apr. 24, 1990 now abandoned and International application PCT/J87/00911 filed on Nov. 25, 1987 and which designated the U.S.

TECHNICAL FIELD

The present invention relates to a novel multifocal lens provided with a clearly sectioned progressive focal segment, which is a midway and a combination of a conventional multifocal lens and a progressive focal lens.

BACKGROUND ART

When a person becomes middle aged, the accommodation power of the ocular lens becomes weak, so that it becomes difficult for the person to adjust the focus sharply in near vision though the person may see well in far vision. This is an unavoidable phenomenon caused by aging, the phenomenon being called prebyopia. A traditional measure to counter prebyopia is to use a multifocal lens having two or more different visual field portions corresponding to different visual distances. Of the different visual field portions, an auxiliary visual field portion is called "a segment". A great deal of development effort has been exerted for a long time into a segment constituted by an unifocal area having low astigmatism and moderate addition.

In the multifocal lens, however, there is no freedom to apply an ideal optical design thereon, because of the narrowness of the progressive focal area and the monotonousness of the progressive distribution. Accordingly, use of the technique in practice is attended with difficulties. Those multiple lenses belong to a technique having means different from those of the present invention and in each of those multiple focal lenses no progressive focal area is provided in its segment portion. Explanation will next be made as to comparison between the prior art Japanese Patent Unexamined Publication No. earlier mentioned and the present invention. 1. [Differences in Subject Matter]: The prior art is directed to a plastic lens based on the manufacturing method disclosed or taught therein, while the present invention is directed to general lenses including an inorganic glass lens and also to a bonded lens. 2. [Superiority]: In the prior art, progressive deformation is provided to a mold having a segment previously formed therein so that it is impossible to provide a correct progressive portion only to the segment, which results in that, since this is a conventionally existing progressive focal lens, the progressive deformation causes astigmatism and distortion to be left even in the main lens; whereas, in the present invention, such astigmatism and distortion are not present as a matter of course, since the entire main lens corresponds to a unifocal area with no progressive portion. Further, the present invention is superior to the prior art in that a freely designed progressive distribution can be provided only to the segment so that, even in the case of a sharply progressive design, this can affect only a step in the boundary of the segment and cannot affect the main lens at all. 3. [Uniqueness]: For the purpose of forming the shape of a segment, the prior art inevitably requires a refracting power difference of at least 0.5 diopter in the upper portion of the segment. According to the present invention, on the other hand, the shape of the segment can be set from the initial stage so that the refracting power can be set equal to that of the main lens, whereby stepless progression can be uniquely attained 4. [Differences in Object]: The prior art is different in object from the present invention in that the object of the prior art is to weaken the quantity of addition of the provided segment corresponding to the segment for the purpose of reducing the lateral astigmatism and distortion caused by the progression, while the object of the present invention is to realize the quantity of strong addition conversely with use of the progressive focal segment. 5. [Advanceability, Difficulty]: It is impossible to realize the provision of the progressive portion only to the segment or the provision of prism thereto without any restrictions, which forms a feature of the present invention, according to the manufacturing method disclosed or taught in the prior art. Such a feature can be realized only according to the high-degree unique manufacturing method of the present invention to be detailed later.

According to the present invention, it is intended that, changing conception apart from readly-made ideas, a main lens portion is left as it is as a unifocal area, and a segment having a limited size is used, while conversely utilizing the feature that the segment is small, to thereby extremely enlarge the optical capacity by application of a progressive focal function to the segment.

DISCLOSURE OF INVENTION (a. A low-astigmatism portion in a progressive focal area is used.)

A main object of the present invention is in that only a portion near a progressive curve where astigmatism is necessarily produced in a progressive focal area is minimized is used limitatively within a segment to thereby remove a harmful portion. Because progression in the progressive focal area is carried out along one progressive curve, larger astigmatism is generated as an optical character, as a position comes far from the progressive curve toward the sides. Removing the optically harmful portion improves the optical characteristic as spectacles greatly, and therefore how to remove the optically harmful portion is a more important problem than any other problem as to how to additionally provided any other function.

(b. A visual field having no distortion and no swinging is enlarged over the whole area.)

Image distortion in the side visual field and the defect in undulating or swinging feeling of the lateral movement of the visual point occur necessarily in the progressive focal area. A user may suffer from nausea as if he got seasick, before he gets used to the defect.

Another object of the invention is in that a portion in which a defect is little so as not to exert any influence on the visual field in the vicinity of the progressive curve is used in the segment while a unifocal area of a main lens outside the segment is used with respect to the side visual field in which swinging will be felt, to thereby obtain a stable visual field without any distortion and swinging which have not been avoided in a conventional multifocal lens.

(c. The progressive focal area is designed idealistically and freely.)

To obtain a large degree of progression in a short progressive distance or to obtain smoothness to avoid a sudden image change when the visual point is shifted from the unifocal area to the progressive focal area, it is necessary to design the degree of progression so as to strengthen or weaken it freely without limitation of the sides. Further, in order to improve the optical characteristic by reducing astigmatism, distortion and the like, it is necessary to provide progressing in the directions other than the direction of the progressive curve so that the progressive focal area is designed as a complicated nonsphere. To pursue these ideals, it is necessary to remove a harmful portion which is produced necessarily in an extension surface and which becomes large as the position comes far from the progressive curve to the sides. A further object of the invention is therefore to make it possible to design an ideal surface freely within the segment by cutting off continuity at the boundary line of the segment so that the progressive focal surface to be used is limited to a low-astigmatism portion near the progressive curve.

(d. A visual field having a non-stepwise continuous range of visual distance is obtained.)

A further object of the invention is in that a progressive focal area between a far visual point and a near visual point in a progressive focal lens is provided in a known segment to thereby obtain clear vision non-stepwise and corresponding to the wide visual distance range to thereby improve the capacity in visual field of the segment greatly.

(e. Jump is minimized at the upper portion of the segment.)

A further object of the invention is to minimize the jump at the upper portion of the segment. In general, when the light of sight is shifted into the segment from far vision toward near vision, an image is floated to jump up suddenly at the boundary line of the segment. This is because a base down prism is added when the line of sight passes through the boundary line. As the degree of addition increases, that is, as the segment center is apart from the optical center of far vision, the jump becomes larger, so that a dead angle where the image becomes invisible occurs on a part of the boundary line. To remove this, it is necessary to add a moderate base up prism to the segment.

(f. Left and right prisms are equilibrated in the vertical direction of near vision.)

In general, spectacles are adjusted by reference to the optical centers of far vision of left and right lenses. It is however general that the left and right lenses are different from each other in the degrees of refracting power. A multifocal lens has a near vision unifocal area in a position apart from the optical center of far vision. As the result, the prism refracting power in the vertical direction of near vision is different with respect to left and right eyes. As the difference increases, fatigue occurs more easily, and if the difference exceeds a limit in which an image blending function can be carried out, a double image is produced to show symptoms of diplopia. To remove the difference, slab-off treatment is applied to one lens to equlibrate left and right lenses. This requires special order by a skillful technique, so that the cost increases. Further, it is undesirable in appearance to form slab-off treated lines laterally only on the one lens. A further object of the invention is in that a series of prism segments are prepared step-wise in advance as half-finished articles by adding prisms to segments so that an optimum prism segment can be easily selected for use in accordance with a prescription.

(g. The weight of a convex lens is reduced.)

In a convex lens, the prism required for progression in a conventional progressive focal lens or for slab-off treatment is applied to the full lens width. Accordingly, the total thickness of the convex lens is necessarily increased to thereby increase the weight of the convex lens. A further object of the invention is in that the increase of the prism thickness is limited only to a segment used for near vision to thereby reduce the weight of the convex lens remarkably.

(h. A synthetic optical center is given also to the near vision sphere.)

The term "synthetic optical center" is defined as an optical center in which a value of 0 is given by combining the prism of the segment and the prism of the main lens. In such a synthetic optical center, a matter can be seen in a correct direction. In the case of conventional various multifocal lenses, when an optical center is given to the far vision sphere, it is very difficult to give a synthetic optical center to the near vision sphere. A further object of the invention is in that an optimum prism segment is easily selected according to a prescription from the series of prism segments prepared as described above to thereby give a synthetic optical center to the near vision sphere.

BEST MODE FOR CARRYING OUT THE INVENTION

Figure 1:
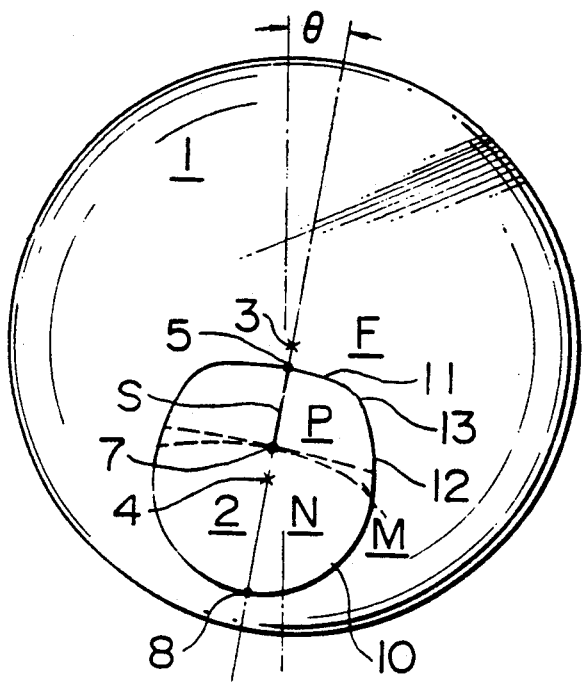
FIG. 1 is a front view showing Embodiment 1.

As a method for giving refracting power to a segment, there is a method of partially changing the refracting power of a material. In order to adjust fine refractive power, however, a method of changing surface refracting power is used in the present invention.

Embodiment 1 will be described with reference to FIGS. 1 and 2. A main lens 1 has a far vision sphere F with an optical center 3 of far vision. A lower portion is a segment 2 having a clearly sectioned upper boundary line 11 and a lower portion of a sphere N having refracting power used for near vision. The near vision sphere N has an optical center 4 of near vision in the near vision sphere N. An upper portion of the segment forms a low-astigmatism progressive refracting power area P for progressing from the surface refracting power of the far vision sphere to the surface refracting power of the near vision sphere along a progressive curve S which leads from an upper edge center 5 on the boundry line 11 to an upper edge center 7 of the near vision sphere N along a line from the far vision sphere to the near vision sphere.

A smooth marginal surface M shown by the dotted line is formed so as to be smoothly widened toward the both sides in order to make the sphere and the area continuous to avoid a sudden change of the surface refracting power.

It is preferable that, in use, the segment is arranged at an inclination angle $\alpha$, for example, generally, about 10°, with respect to a vertical direction as shown in FIG. 1, to adjust the direction of movement of eyes from far vision to near vision. At the same time, it is preferable that an upper boundary line of the segment is shaped like a gentle circular arc substantially perpendicular to the progressive direction for the double purpose of unhindering horizontal visual field and making the segment symmetrical. It is necessary that the radius of curvature of the circular arc is established to be larger than the diameter of the segment. When, for example, the diameter of the segment is 30 mm, the most preferred radius of curvature of the circular arc is 45 mm, that is, 1.5 times the diameter of the segment.

Figure 2:
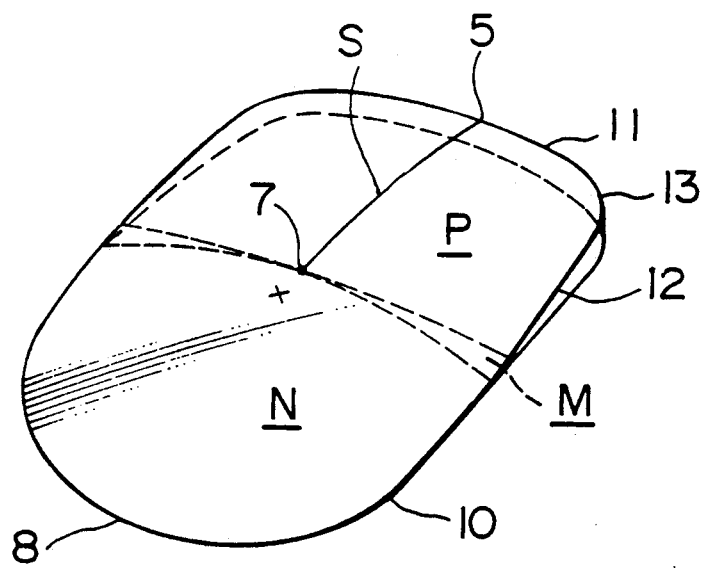
FIG. 2 is a perspective view of the segment in Embodiment 1.

In FIGS. 1 and 2, in an optical design in which only the movement of eyes between the far vision sphere F and the near vision sphere N is considered, the upper boundry line of the segment becomes a straight line perpendicular to the progressive curve S. With respect to external appearance in use, however, it is preferable that the upper boundary line is shaped like a gentle circular arc. Accordingly, the upper edge portion of the segment 2 is optically designed to have uniform surface refracting power along the gentle circular arc from the progressive curve to the opposite sides.

The appearance is elegant if a side boundary line 12 of the segment is made to be a circular arc of the same curvature, but this shape is not limited. At a point of contact between the circular arc of the segment upper boundary line 11 and the circular arc of the segment side boundary line 12, a segment shoulder boundary line 13 is made so as to be rounded off with a radius of curvature R to facilitate the production of the segment.

Embodiment 2 will be described with reference to FIGS. 5 and 6. A main lens 1 is made to be a far vision sphere F containing an optical center 3 of far vision. The clearly sectioned upper portion of a segment 2 is made to be an intermediate vision refracting power sphere I used frequently in an individual life, so that a stable visual field is provided therein. The lower portion of the segment is made to be a near vision refracting power sphere N in which a sphere shape center 4 of near vision exists. An area between the two spheres is made to be as a low-astigmatism progressive refracting power area P for progressing from the surface refracting power of the intermediate vision sphere to the surface refracting power of the near vision sphere along a progressive curve S which leads from a lower edge center 6 of the intermediate vision sphere I to an upper edge center 7 of the near vision sphere N.

Smooth marginal surfaces M shown by the dotted line are configured so as to be smoothly widened toward opposite sides in order to make the three spherical areas continuous while avoiding a sudden change in surface refracting power.

Figure 5:
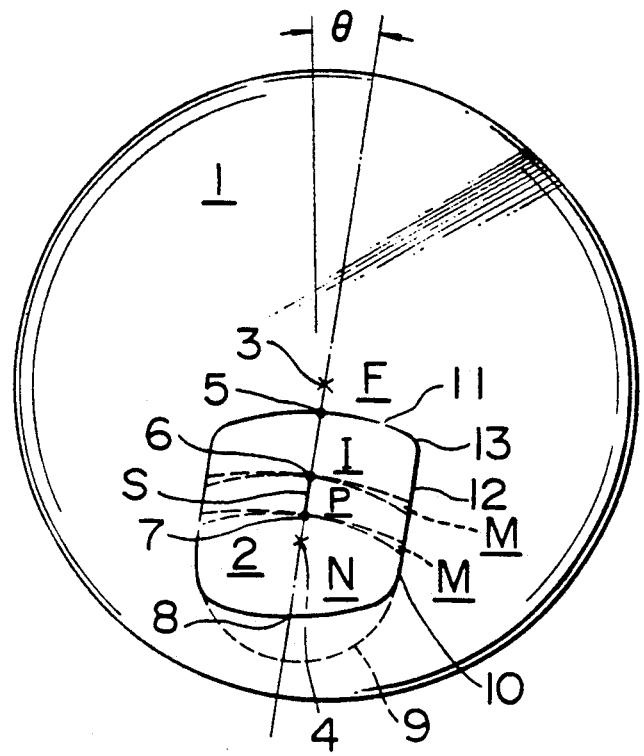
FIG. 5 is a front view showing Embodiment 2.
Figure 6:
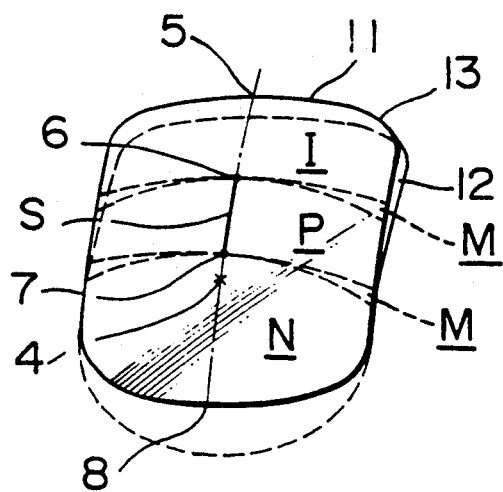
FIG. 6 is a perspective view of the segment in Embodiment 2.

It is preferable that, in use, the segment is inclined by an angle $\alpha$, for example, generally, about 10°, with respect to a vertical direction as shown in FIG. 5, to adjust the direction of movement of eyes from far vision to near vision. At the same time, it is preferable that the upper boundary line of the segment is shaped like a horizontally gentle circular arc for the purpose of unhindering the horizontal visual field in far vision and intermediate vision. It is necessary that the radius of curvature of the circular arc is established to be larger than the diameter of the segment. When, for example, the diameter of the segment is 30 mm, the most preferred radius of curvature of the circular arc is 45 mm, that is, 1.5 times the diameter of the segment.

The appearance is elegant if a side boundary line 12 of the segment is made to be a straight line in parallel to the progressive direction, but this shape thereof is not limited. At a point of contact between the circular arc of the segment upper boundary line 11 and the straight line of the segment side boundary line 12, formed is a segment shoulder boundary line 13 which is rounded off with a radius of curvature R for facilitating the production of the segment. It is preferable that the lower portion of the segment is formed of a horizontally gentle circular arc, not a semicircle 9 shown by the dotted line, in the same manner as that of the upper portion thereof, whereby an advantage arises in that the height of the segment and the thickness of the prism segment can be reduced. This embodiment is useful in the case where a stable unifocal area of intermediate vision is required because of necessity of fixing eyes on one position in business. In the case where addition is large, the addition changes as a result of slight movement of eyes so that focal instability cannot be avoided. A good continuous visual field can be obtained easily, however, if the degree of addition is limited within a range from intermediate vision to near vision. Accordingly, this embodiment is useful particularly in the latter case.

Embodiment 3 in which the whole area of the segment forms a progressive power area will be described (not shown in the drawing). In this embodiment, the respective areas of the near vision sphere N and intermediate vision sphere are not limited regardless of the those areas which have been described in Embodiments 1 and 2. If those areas are excessively minimized, the whole area of the segment becomes a progressive focal area P. The progressive focal segment can be produced by application of a conventional progressive focal lens planning and producing method. Similarly to Embodiments 1 and 2, this embodiment has an advantage in that an ideal planning can be made without limitation of troublesome distorted surfaces which are surely produced on extension according to the prior art in the case where, for example, a portion where the use of the line of sight occurs very frequently in the vicinity of the progressive curve as a standard to reduce aberration, as well as an advantage in that only a portion near the progressive curve can be utilized because the size is limited. This embodiment is particularly useful in the case where eyes are not fixed on one portion and always move between far vision and near vision or between intermediate vision and near vision, for example, in driving, in shopping, etc.

Figure 3:
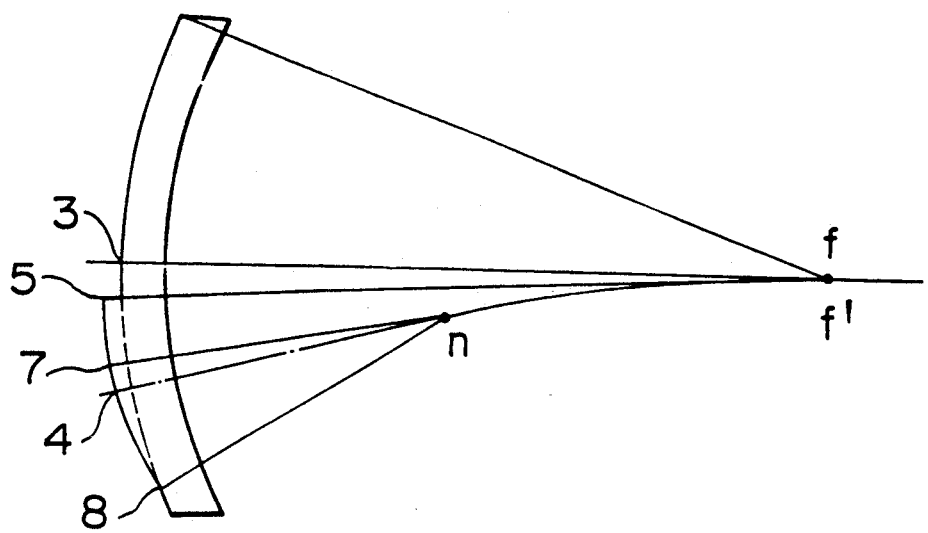
FIG. 3 is a sectional view for explaining a curvature center at minimum jump in the case where the segment in Embodiment 1 is provided in a projecting manner.

An embodiment in which the jump at an upper edge portion of the segment is minimized according to the present invention will be described. In FIG. 3, the image jump at the segment upper edge portion is minimized when a prism is given to the segment to provide coincidence (to make an angle $\beta$, while will be described later, zero) between a line connecting the far vision curvature center f of the main lens and the segment upper edge center 5 and a line connecting the segment upper edge center 5 and the far vision curvature center f' of the segment.

Figure 7:
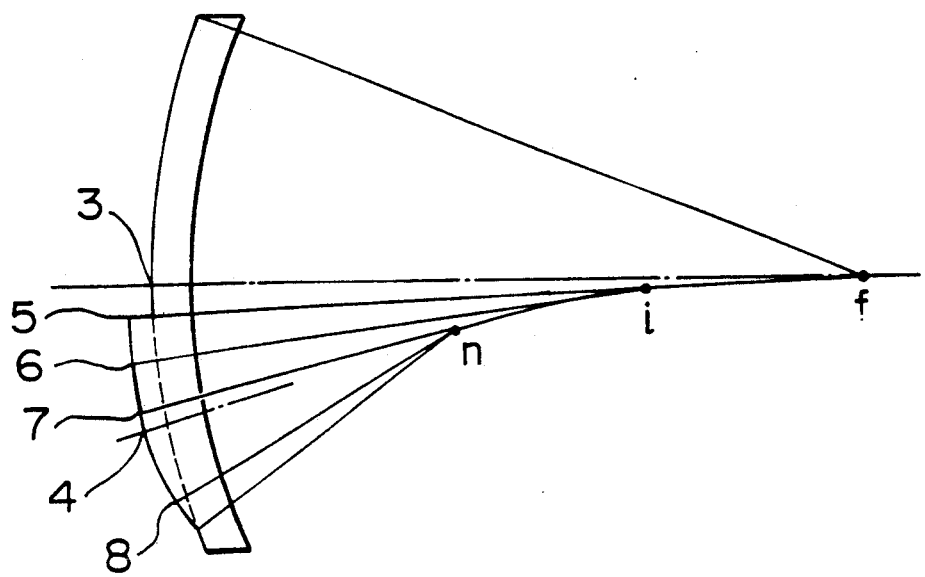
FIG. 7 is a sectional view for explaining a curvature center at minimum jump in the case where the segment in Embodiment 2 is provided in a projecting manner.

Similarly, in FIG. 7, the image jump at the segment upper edge portion is minimized when a prism is given to the segment to provide coincidence (to make an angle $\beta$, which will be described later, zero) between the direction of line connecting the far vision curvature center f of the main lens and the segment upper edge center 5 and the direction of line connecting the segment upper edge center 5 and the intermediate vision curvature center i of the segment.

Figure 4:
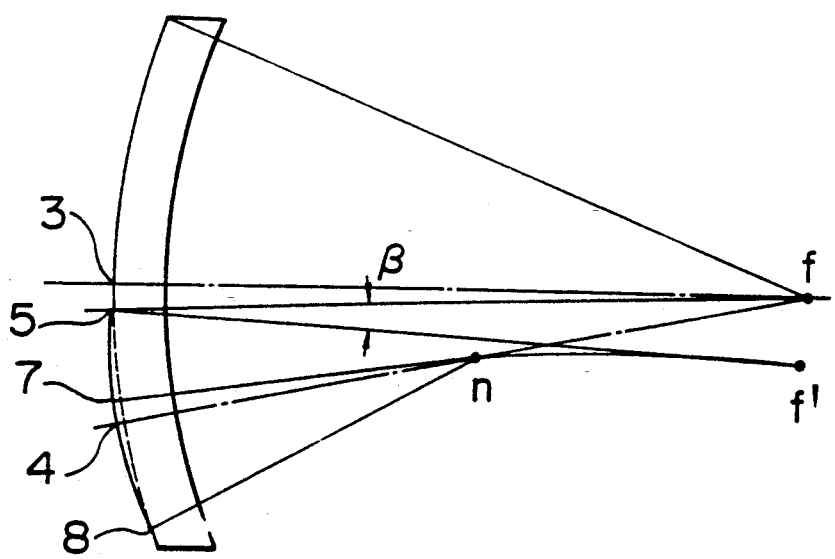
FIG. 4 is a sectional view for explaining a curvature center at a minimum segment level difference in the case where the segment in Embodiment 1 is provided in a projecting manner.
Figure 8:
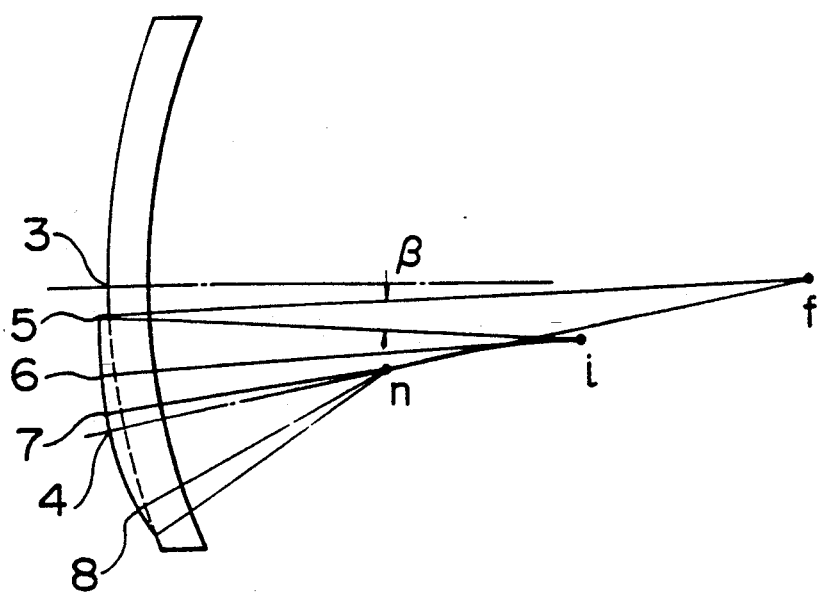
FIG. 8 is a sectional view for explaining a curvature center at a minimum segment level difference in the case where the segment in Embodiment 2 is provided in a projecting manner.

An embodiment in which the level difference in the segment is minimized according to the present invention will be described. The appearance in use of spectacles becomes good when the level difference in the segment is minimized. In FIGS. 4 and 8, a near vision curvature center n of the segment is on a straight line connecting the sphere shape center 4 of near vision and the far vision curvature center f of the main lens, when the level difference of the boundary line 10 in the near vision sphere in FIG. 2 becomes zero.

In this case, an angle $\beta$ is formed between a line connecting the far vision curvature center f of the main lens and the segment upper edge center 5 and a line connecting the segment upper edge center 5 and the far vision curvature center f' of the segment, so that a jump occurs in the segment upper boundary line correspondingly.

Similarly, in FIG. 8, an angle $\beta$ is formed between a line connecting the far vision curvature center f of the main lens and the segment upper edge center 5 and a line connecting the segment upper edge center 5 and the intermediate vision curvature center i of the segment, so that a jump occurs in the segment upper boundary line correspondingly.

An example in which the present invention is realized by equalizing the left and right prisms of near vision will be described. A series of segments in which upper and lower prisms are attached according to the present invention in advance are produced stepwise at intervals of a value such as 0.5 $\Delta$ (prism diopter).

From a prescription, the difference between left and right near vision prisms can be calculated by the formula $$P = D \cdot d/10$$

in which P is the refracting power difference ($\Delta$) between left and right near vision prisms, D is the peak refracting power difference (D) between left and right far visual points, and d is the distance (mm) from a far visual point to a near visual point.

When, for example, a prescription R. S+0.75, L. S+1.50, left and right addition 1.50 and distance d=18 between far and near visual points are given, the peak refracting power difference D between left and right far visual points and the difference P between left and right prisms satisfy the equations D=0.75 and P=0.75×18/10=1.35$\Delta$. Because the values in the prescription are positive, the base up + difference exists in the left lens. Accordingly, a 1.0 $\Delta$ base up or 1.5 $\Delta$ base up prism segment can be selected as a partner right lens. Or a 1.4 $\Delta$ base up segment for minimizing the jump can be selected to make equilibrium. In this case, a "no jump" effect can be obtained at the same time.

When, as another example, a prescription R. S-0.50, L. S-1.00, left and right addition 1.50 and a distance d=18 between far and near visual points are given, the peak refracting power difference D between left and right far visual points and the difference P between left and right prisms satisfy the equations D=0.50 and P=0.50×18/10=0.9$\Delta$. Because the values in the prescription are negative, the base down + difference exists in the left lens. Accordingly, when a 1.0 $\Delta$ base up prism segment is selected as the left lens to make equilibrium to cancel the difference, an effect for reducing the jump can be obtained at the same time. In the cases of Embodiments 2 and 3, prism equilibrium can be calculated at the middle portion of the segment in the same manner as described above.

When the lens as shown in FIGS. 1 through 8 according to the present invention is formed from a glass material by polishing so that the segment is projected, producing cost increases greatly. Moulding by using a plastic material is rather advantageous in that a great deal of copies can be produced. An embodiment in which such moulding is used will be described.

Figure 10:
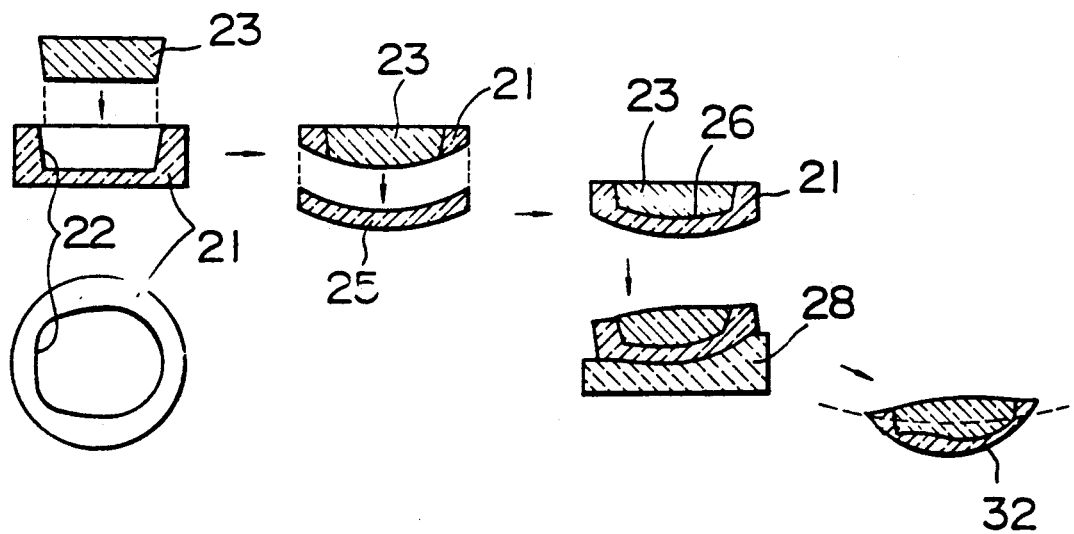
FIG. 10 is a view for explaining a segment carrier for a segment mould in Embodiment 1.
Figure 11:
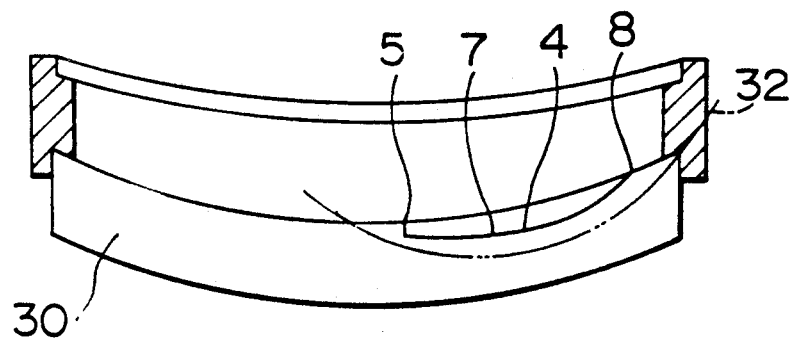
FIG. 11 is a sectional view of a plastic cast mould in Embodiment 1.

FIG. 11 shows an example of a plastic lens cast mould 30. In general, a multifocal lens has a segment at the convex. Moulding of such a lens requires producing the progressive focal segment according to the present invention in the concave of the mould. This requirement can be realized only by a quite novel producing method. As shown in FIG. 10, a concave 22 having a segment profile is formed in a segment profile carrier 21, and an etching glass segment 23 is embedded in the concave 22 and fused together with a thin segment carrier 25 at an optical sphere 26, in advance. Then, a progressive refracting power surface is produced in a fusion surface between the two by a known method to soften/deform glass by using a heat-resisting former 28 formed into an accurate cubic surface. The surface thus produced is formed and polished again into a segment. Then, the segment is fused again on the mould 30 at a fusion sphere 32 as shown by the two-dotted chain line in FIG. 11, by a known method of fusing a main lens and a segment. The segment profile carrier 21, the segment carrier 25 and the main lens material are homogeneous, and therefore they are united into one body after fused so that the fusion surfaces disappear. Then, after a far vision refracting power sphere is formed and polished on the whole surface, the segment portion made of etching glass is removed to thereby produce a concave which becomes a progressive segment according to the present invention is formed. In this case, for making the aforementioned prism segment, a high refractive index glass segment must be located in a fusion sphere position to give a correct prism. A plastic lens having a projected segment is cast by use of this mould by a conventionally known method. Alternatively, the above may be realized through injection moulding, plastic moulding, etc.

Figure 12:
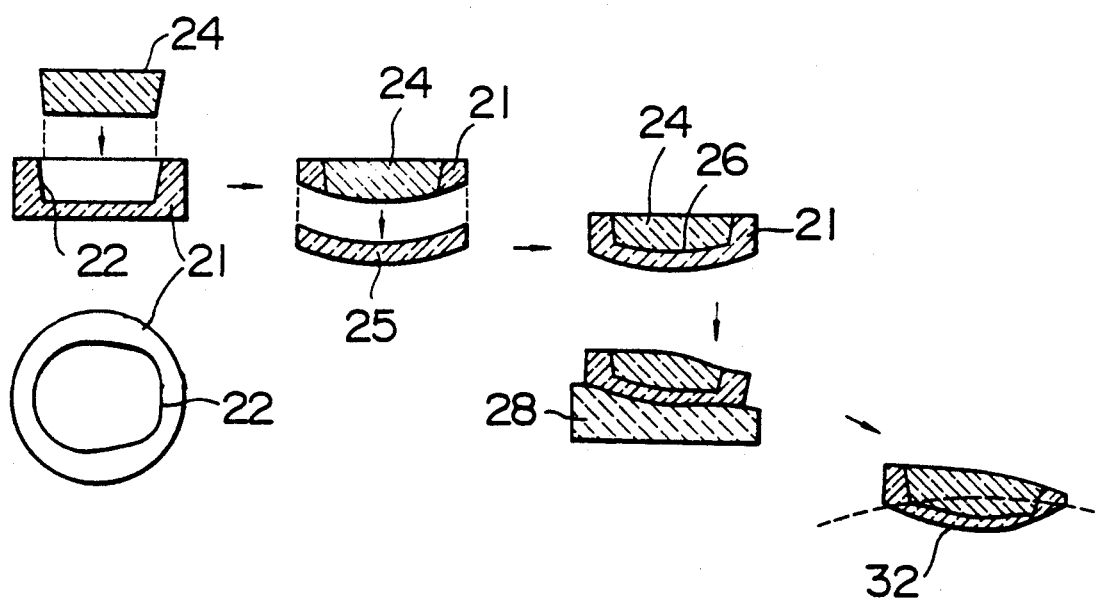
FIG. 12 is a view for explaining a segment carrier for a fusion segment in Embodiment 1.
Figure 13:
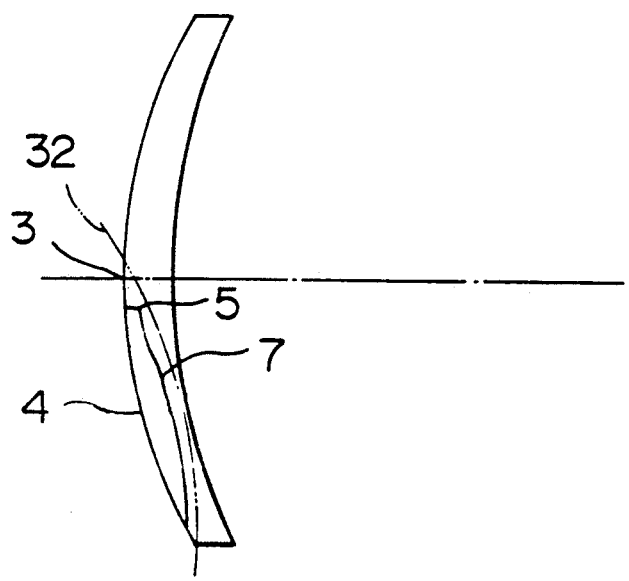
FIG. 13 is a sectional view in the case where the segment of Embodiment 1 is embedded. 1 ... main lens, 2 ... segment, F ... far vision sphere, I ... intermediate vision sphere, P ... progressive focal area, M ... marginal surface, N ... near vision sphere, S ... progressive curve.

An example in which the present invention is applied to a conventional fusion segment will be described. This can be realized only by a quite novel producing method. As shown in FIG. 12, a concave 22 having a segment profile is formed in a segment profile carrier 21, and a high index glass segment 24 is embedded in the concave 22 and fused together with a thin segment carrier 25 at an optical sphere 26, in advance. Then, a progressive refracting power surface is produced in a fusion surface between the two by a known method to soften/deform glass by using a heat-resisting former 28 formed into an accurate cubic surface. The surface thus produced is formed and polished again into a segment. Then, the segment is fused again on a main lens material at a fusion sphere 32 as shown by the two-dotted chain line in FIG. 13, by a known method of fusing a main lens and a segment. The segment profile carrier 21, the segment carrier 25 and the main lens material are homogeneous, and therefore they are united into one body after fused so that the fusion surfaces disappear. Then, a far vision refracting power sphere is formed and polished on the whole surface to thereby produce a fusion segment according to the present invention. In this case, for obtaining the aforementioned prism segment, a high refractive index glass segment must be located in a fusion sphere position to give a correct prism. As described above, the progressive focal area and the prism thereof can be incorporated in the lens. Accordingly, the lens is useful and good in appearance because the outside surface of the lens is so smooth as to prevent deposition of stains.

An example in which the present invention is applied to a stuck segment will be described. A segment as shown in FIGS. 2 and 6 is formed of an optically transparency material, separately. By sticking the segment to a main lens with an optical adhesive agent, the segment can be provided to be projected. If a material such as plastics having slight flexibility is used, the material can be used in a sphere of a slightly different curvature or a toric surface in a unifocal lens so that the invention can be applied to spectacles which is being used. This is a novel feature in that the lens according to the invention can be economically used as a conventional multifocal lens. This example is very useful in the case where the lens economically prepared according to the present invention is used by way of experiment to understand the effect of the invention.

The feature in which a logarithmic spiral is used as a progressive curve S according to the present invention will be described. The progressive curve is not limited to the logarithmic spiral, and any may be used as the progressive curve. As the results of various investigations, however, it has been found that the use of a logarithmic spiral is suitable to the degree of geometric progress and the rate of increase of refracting power corresponding to the movement of eyes from far vision to near vision, and that the use of a logarithmic spiral is suitable also for selection of a logarithmic spiral of necessary progressive power from the length of the progressive focal area and the radii of curvature before and after the progressive focal area and for obtaining a progressive prism angle to calculate an image jump angle $\beta$ as described above.

Figure 9:
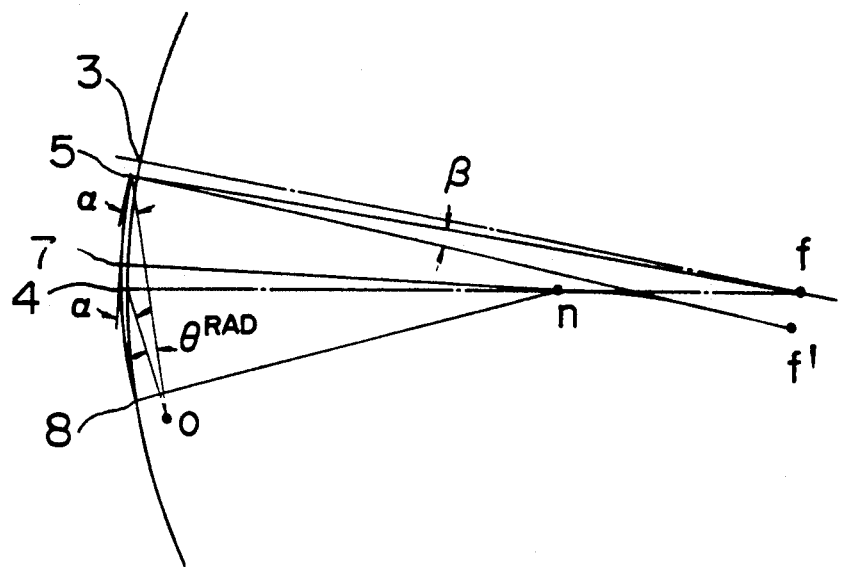
FIG. 9 is a view for explaining a logarithmic spiral as a progressive curve.

In FIG. 9, the progressive curve from 5 to 7 is a logarithmic spiral with O as a pole, which is represented by the following formula.

$$r = r_0 e^{74 \cot \alpha}$$

in which:
Progressive curve length: l
Radius of curvature of far vision refracting power sphere: $R_1$
Radius of curvature of near vision refracting power sphere: $R_2$
Equal angle of logarithmic spiral: $\alpha = \tan^{-1} l/R_1 - R_n$
Radius vector of logarithmic spiral from 0 to 5: $r_f = R_f \sin \alpha$
Radius vector of logarithmic spiral from 0 to 7: $r_n = R_n \sin \alpha$
Radius vector angle (Rad) of logarithmic spiral: $\theta = \log k \cdot R_f/R_n$
Constant of logarithmic spiral: $k = e^{2\pi \cot \alpha}$ The angle $\beta$ between the direction of line from 5 to f and the direction of line from 5 to f' can be calculated by using the above equations in the case where the diameter of the segment in the far vision sphere and the length of the progressive curve in Embodiment 1 are 30 mm and 12 mm, respectively. The results are shown as follows.

| Name   | Addition | $R_f$ | $R_n$  | $\alpha$ | $\beta$ |
|--------|----------|-------|--------|----------|---------|
| 6.00 + | 1.00 Add | 92.00 | 77.679 | 39.961   | 0.953   |
| 6.00 + | 1.50 Add | 92.00 | 72.069 | 31.051   | 1.424   |
| 6.00 + | 2.00 Add | 92.00 | 67.215 | 25.835   | 1.881   |
| 6.00 + | 2.50 Add | 92.00 | 62.974 | 22.461   | 2.325   |
| 6.00 + | 3.00 Add | 92.00 | 59.236 | 20.116   | 2.757   |

INDUSTRIAL APPLICABILITY

The present invention is useful with the following effects.

a. There is an effect in that a harmful portion can be removed by using only a low-astigmatism portion in the vicinity of the progressive curve while limiting the progressive focal area within the segment. In particular, the invention is useful in spectacles having a high degree of addition.

b. There is an effect in that a stable wide visual field can be obtained without distortion such as falling of vertical line and inclination of horizontal level in a side visual field and without any defect of swinging feeling of the lateral movement of the visual point. In particular, the invention is useful in spectacles for a person seeing erection or inclination of a target in a visual field.

c. There is an effect in that the progressive focal area can be designed freely to obtain a large degree of progress in a short progressive distance or to obtain smoothness by avoiding a sudden image change when the visual point is shifted from a unifocal area to the progressive focal area.

d. There is an effect in that a visual field of clear vision non-stepwise and corresponding to a wide range of visual distance can be obtained in the segment. In particular, the invention is useful in spectacles having a high degree of addition.

e. There is an effect in that no jump occurs in the upper portion of the segment. In particular, the invention is useful in spectacles for a person moving his eyes between far vision and near vision frequently.

f. There is an effect in that an optimum segment according to a prescription can be selected easily from a series of prism segments prepared stepwise as half-finished articles in advance to equilibrate left and right prisms in the vertical direction of near vision with low cost without special order such as slab-off. In particular, the invention is useful in spectacles for a person having a large difference in addition between his left and right eyes.

g. There is an effect in that the prism thickness of a convex lens required for progression or slab-off can be reduced to lighten the weight of the lens remarkably. In particular, the invention is useful in spectacles for a person having a large difference in addition between his left and right eyes.

h. There is an effect in that an optimum segment according to a prescription can be selected easily from a series of prism segments prepared stepwise as half-finished articles in advance to give a synthetic optical center to the near vision sphere. In particular, the invention is useful in spectacles in the case where the near vision sphere is used for a long time or in the case where finger work is carried out.

As described above in detail, not only there is an advantage that a progressive focal area is provided in a segment of a multifocal lens, but there are a large number of effects produced generally and geometrically, so that there is utility in that a lens suitable to the user's fashion of use of the multifocal lens and the optical character thereof can be selected and provided easily and freely, and the comfortableness which has been never obtained in use of spectacles.

I claim:

1. In a multifocal lens having a non-progressive, unifocal main lens (1) and a clearly sectioned segment (2) thereon for additional surface refracting power, the improved segment comprising:

a first unifocal area (N) on said segment (2) and a low-astigmatism progressive focal area (P) on said segment, the progressive focus being provided only within said progressive focal area (P), and said areas (N, P) being continuous to avoid a sudden image change.

2. A multifocal lens according to claim 1, and further comprising a second unifocal area on an upper portion of said segment that forms an intermediate vision sphere (I), wherein said main lens forms a far vision sphere (F), said clear sectioning of said segment is an upper boundary line forming a circular arc with a radius of curvature not smaller than the diameter of said segment, said first unifocal area is a lower portion of said segment forming a near vision sphere (N), and said progressive focal area (P) is a middle portion of said segment that extends from said upper portion to said lower portion of said segment and has refracting power that progresses from a refracting power of said intermediate vision sphere to a refracting power of said near vision sphere.

3. A multifocal lens according to claim 2, and further comprising a prism at said upper boundary line in an amount required for providing coincidence between a focal direction at said upper boundary line of said segment and a focal direction at an adjacent portion of said main lens so that an image jump is minimized when lines of sight move across said upper boundary line.

4. In a multifocal lens having a non-progressive, unifocal main lens and a clearly sectioned segment thereon for additional surface refracting power, the improved segment comprising:

a first unifocal area on said segment and a low-astigmatism progressive focal area on said segment, the progressive focus of said progressive focal area progressing along a line connecting a far visual point of said main lens and a near visual point of said segment, said areas being continuous to avoid a sudden image change, wherein said main lens forms a far vision sphere (F), said clear sectioning of said segment is an upper boundary line forming a circular arc with a radius of curvature not smaller than a diameter of said segment, said first unifocal area is a lower portion of said segment forming a near vision sphere (N), and said progressive focal area (P) is an upper portion of said segment in which refracting power progresses from a refracting power of said far vision sphere to a refracting power of said near vision sphere.

5. A multifocal lens according to claim 4, and further comprising a prism at said upper boundary line in an amount required for providing coincidence between a focal direction at said upper boundary of said segment and a focal direction at an adjacent portion of said main lens so that an image jump is minimized when lines of sight move across said upper boundary line.

6. A multifocal lens according to claim 4 and further comprising a second unifocal area on an upper portion of said segment that forms an intermediate vision sphere (I), wherein said main lens forms a far vision sphere (F), said clear sectioning of said segment is an upper boundary line forming a circular arc with a radius of curvature not smaller than the diameter of said segment, said first unifocal area is a lower portion of said segment forming a near vision sphere (N), and said progressive focal area (P) is a middle portion of said segment that extends from said upper portion to said lower portion of said segment and has refracting power that progresses from a refracting power of said intermediate vision sphere to a refracting power of said near vision sphere.

7. A multifocal lens according to claim 6, and further comprising a prism at said upper boundary line in an amount required for providing coincidence between a focal direction at said upper boundary line of said segment and a focal direction at an adjacent portion of said main lens so that an image jump is minimized when lines of sight move across said upper boundary line.

* * * * *